United States Patent
Hung

(10) Patent No.: US 12,512,133 B2
(45) Date of Patent: Dec. 30, 2025

(54) SYSTEM FOR SHARING STATUS AMONG MULTIPLE DEVICES

(71) Applicant: MACRONIX INTERNATIONAL CO., LTD., Hsinchu (TW)

(72) Inventor: Shuo-Nan Hung, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 335 days.

(21) Appl. No.: 18/209,160

(22) Filed: Jun. 13, 2023

(65) Prior Publication Data

US 2024/0420744 A1   Dec. 19, 2024

(51) Int. Cl.
*G11C 7/10* (2006.01)

(52) U.S. Cl.
CPC .......... *G11C 7/1063* (2013.01); *G11C 7/1039* (2013.01); *G11C 7/1048* (2013.01)

(58) Field of Classification Search
CPC ................................ G11C 7/1063; G11C 7/10
USPC ......................................................... 365/191
See application file for complete search history.

(56) References Cited

U.S. PATENT DOCUMENTS

| | | | |
|---|---|---|---|
| 7,832,842 B2 * | 11/2010 | Jackson Pulver | B41J 2/145 347/57 |
| 9,910,600 B2 | 3/2018 | Buxton et al. | |
| 11,354,041 B2 | 6/2022 | Lindberg et al. | |
| 2005/0138506 A1 * | 6/2005 | Stocken | G11C 29/56 714/724 |
| 2006/0282582 A1 * | 12/2006 | Takemae | G06F 12/00 710/62 |
| 2011/0072088 A1 | 3/2011 | Kiyohara | |
| 2013/0250809 A1 | 9/2013 | Hui et al. | |
| 2016/0294940 A1 * | 10/2016 | Ma | H04L 67/1078 |
| 2018/0342302 A1 * | 11/2018 | Chang | G11C 16/20 |
| 2023/0043418 A1 | 2/2023 | Schuh et al. | |

FOREIGN PATENT DOCUMENTS

| | | |
|---|---|---|
| CN | 101594297 A | 12/2009 |
| CN | 114157601 A | 3/2022 |
| TW | I445359 B | 7/2014 |

OTHER PUBLICATIONS

Hu et al., "Performance Impact and Interplay of SSD Parallelism through Advanced Commands, Allocation Strategy ind Data Granularity," Proceedings of the international conference on Supercomputin, May 2011, 13 pages.*
Intel et al., "Open NAND Flash Interface Specification," Rev. 5.1, May 3, 2022, 398 pages.*
Hu et al., "Performance Impact and Interplay of SSD Parallelism through Advanced Commands, Allocation Strategy and Data Granularity," Proceedings of the international conference on Supercomputin, May 2011, 13 pages.

* cited by examiner

*Primary Examiner* — Muna A Techane
(74) *Attorney, Agent, or Firm* — Andrew L. Dunlap; Haynes Beffel & Wolfeld LLP

(57) ABSTRACT

A system having a data bus, a source node device on the data bus and a group of bus node devices on the data bus. The source node device is configured to transmit a group read status command on the data bus. The bus node devices in the group are configured to respond to the group read status command in sequence, by transmitting status data on the data bus in respective, non-overlapping timing windows. The system can be a memory system.

20 Claims, 6 Drawing Sheets

SYSTEM FOR SHARING STATUS AMONG MULTIPLE DEVICES

BACKGROUND

Field

The technology presented herein relates to data processing systems, such as memory systems, and to sharing the status data among the components of the systems.

Description of Related Art

Data processing systems can comprise a number of processing nodes linked to a communication network. These systems can execute procedures arranged in server/client configurations, where a server procedure transmits commands from one node in the network to other nodes on the network at which the client procedures indicated by the commands are to be executed. In some cases, the server procedure gathers status information from the nodes in the network for management of the commands issued to the various client procedures.

For example, memory systems can comprise a memory controller device and a plurality of memory devices arranged in a bus topology. The memory controller device can include a bus master interface connected to a communication bus. A group of the memory devices can have respective bus slave interfaces connected to the communication bus. The memory devices maintain status information about one or more status units on the devices. In order for the memory controller to access this status information, it issues status read commands on the communication bus to each of the devices. In response to the read status command, the memory devices transmit status data back on the communication bus to the memory controller.

For example, a memory system known as a solid-state disk SSD can include a memory controller and many (e.g., 64) high density NAND flash memory devices. Each of the NAND flash memory devices can include one or more status units each having a different status, and capable of executing memory operations requested by the memory controller. A procedure that involves commands transmitted in sequence to each of the many NAND flash memory devices for status consumes substantial bus overhead, reducing the data throughput for the memory system.

Thus, procedures for gathering status information in memory systems, and in other data processing systems, can involve significant read status timing overhead, and as the number of nodes on the communication network increases, the overhead also increases.

It is desirable to provide technologies for improving the efficiency of data processing systems, including memory systems.

SUMMARY

A technology is described that can significantly reduce communications overhead involved in retrieving status information from client nodes in a network, including bus topology networks.

One aspect of the technology is a system comprising a data bus, a source node device on the data bus and a group of bus node devices on the data bus. The source node device is configured to transmit a group read status command on the data bus. The bus node devices in the group are configured to respond to the group read status command in sequence, by transmitting status data on the data bus in respective, non-overlapping timing windows.

The technology can be applied in a variety of network configurations. According to one configuration described herein the data bus includes a set of bus signal lines. The group read status command is transmitted on specific lines in the set of bus signal lines, and the status data is transmitted on one or more of the same specific lines in the set of bus signal lines. According to another configuration described herein, the set of bus signal lines on the data bus includes a set of data lines and a separate set of command/address lines. The group read status command can be transmitted on the command/address lines. In some embodiments, the group read status command and the status data can be transmitted by the source node device and the bus node devices on the same command/address lines.

According to another aspect of the technology described herein, the status data includes multiple bits for each bus node device. For example, a bus node device can include a plurality of status units, each having status such as a ready status and a busy status. The status data transmitted by the bus node device in this case can include status of the plurality of status units for the bus node device.

Embodiments of the technology can be implemented in which the bus node devices respectively include a plurality of bonding pads connected to reference voltages, such as power and ground supply lines of the data bus, in different bonding patterns to provide local device addresses. The local device addresses can be used by logic on the bus node devices to determine the timing windows in which to transmit local status onto the bus.

In an aspect of the technology described herein, a bus node device comprises an integrated circuit device. The integrated circuit device can comprise a bus interface for connections to the data bus, and a circuit such as a status register, to provide status of resources on the integrated circuit device. For example, the integrated circuit device can comprise a high-density NAND flash memory device having a plurality of status units. The status register, or other status indicator, can provide status information for each of the status units in the plurality of status units.

The integrated circuit device can include a circuit to provide a local device identifier, such as a local device address within the group on the bus. The command decoder on the integrated circuit device is connected in communication with the bus interface. The command decoder includes circuits to detect a group read status command associated with an initial device identifier. In response to detection of the group read status command, the integrated circuit device executes an operation including:

a) comparing the initial device identifier with the local device identifier, and for a match outputting the status data to the data bus during an initial bus timing window, and for a mismatch disabling output to the data bus;

b) incrementing the initial device identifier to an incremented device identifier, and comparing the local device identifier to the incremented device identifier, and for a match outputting the status of the bus node to the data bus in a subsequent bus timing window, and for a mismatch disabling output to the data bus; and c) repeating step b) until a termination event.

Also, the operation can include outputting a transition state to the bus during transition timing windows at least one of before and after outputting the status.

Other aspects and advantages of the technology presented herein can be seen on review of the drawings, the detailed description and the claims, which follow.

DETAILED DESCRIPTION

A detailed description of embodiments of one or more aspects of the present technology is provided with reference to the FIGS. 1-7.

Figure 1:
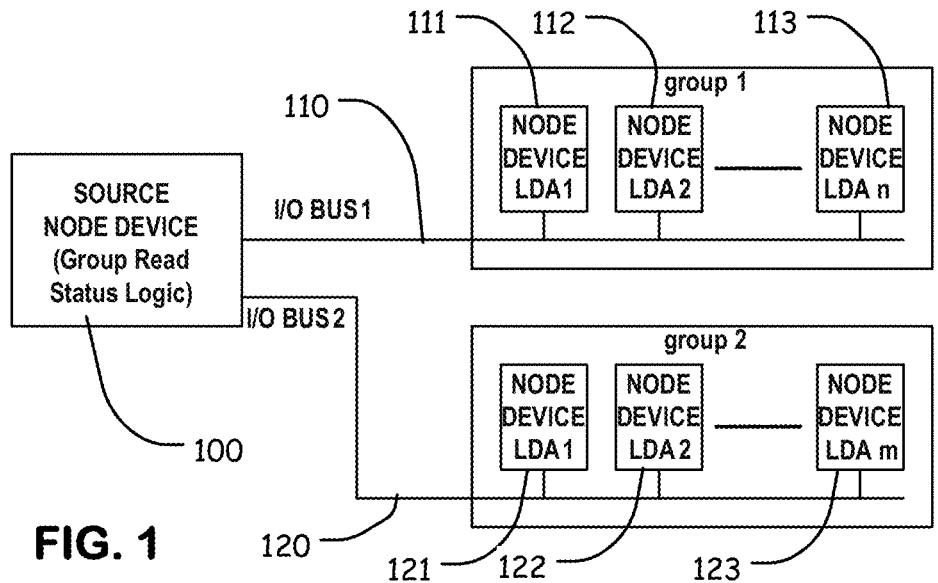
FIG. 1 is a simplified block diagram of a data processing system configured for group read status operations as described herein.

FIG. 1 is a simplified diagram of a data processing system, such as a memory system, having a communication network with a bus topography. The system includes a source node device 100 that has a bus master interface for multiple busses, I/O BUS 1 and I/O BUS 2, each of which comprises a set of bus signal lines 110, 120.

A first group of bus node devices 111, 112, . . . 113 is disposed on I/O BUS 1. A second group of bus node devices 121, 122, . . . 123 is disposed on I/O BUS 2. The bus node devices 111, 112 . . . 113 include bus slave interfaces to the bus signal lines on I/O BUS 1. The bus node devices 111, 112 . . . 113 each have a local device identifier, such as a device address unique as to other bus node devices on the same bus. In this example, bus node devices 111, 112 . . . 113 have respective local, device addresses LDA1, LDA2, LDAn, each of which is unique on I/O BUS 1. The bus node devices 121, 122 . . . 123 include bus slave interfaces to the bus signal lines on I/O BUS 2. The bus node devices 121, 122 . . . 123 each have a local device identifier, such as a device address unique as to other bus node devices on the same bus. In this example, bus node devices 121, 122 . . . 123 have respective local, device addresses LDA1, LDA2, LDAm, each of which is unique on I/O BUS 2.

The source node device 100 includes group read status logic which executes an operation to gather status information from the bus node devices in groups 1 and 2. A source node device may be distinguished in this context by having logic acting as a source of the group read status command. A bus node device may be distinguished by having logic to respond to a group read status command in this context. There may be more than one source node device. Also, a source node device may also include logic to act as a bus node device in systems having a plurality of source nodes.

In order to gather status information from bus node devices in group 1, the group read status logic at source node device 100 transmits one group read status command on the signal lines 110 of I/O BUS 1. The bus node devices 111, 112, 113 respond with status data in respective non-overlapping timing windows. The group read status logic at source node 100 links the status information with the corresponding operations at specific bus node devices based on the timing windows in which the status information is received.

Likewise, in order to gather status information from bus node devices in group 2, the group read status logic at source node device 100 transmits one group read status command on the signal lines 120 of I/O BUS 2. The bus node devices 121, 122, 123 respond with status data in respective non-overlapping timing windows. The group read status logic at source node device 100 links the status information with the corresponding operations at specific bus node devices based on the timing windows in which the status information is received.

Figure 2:
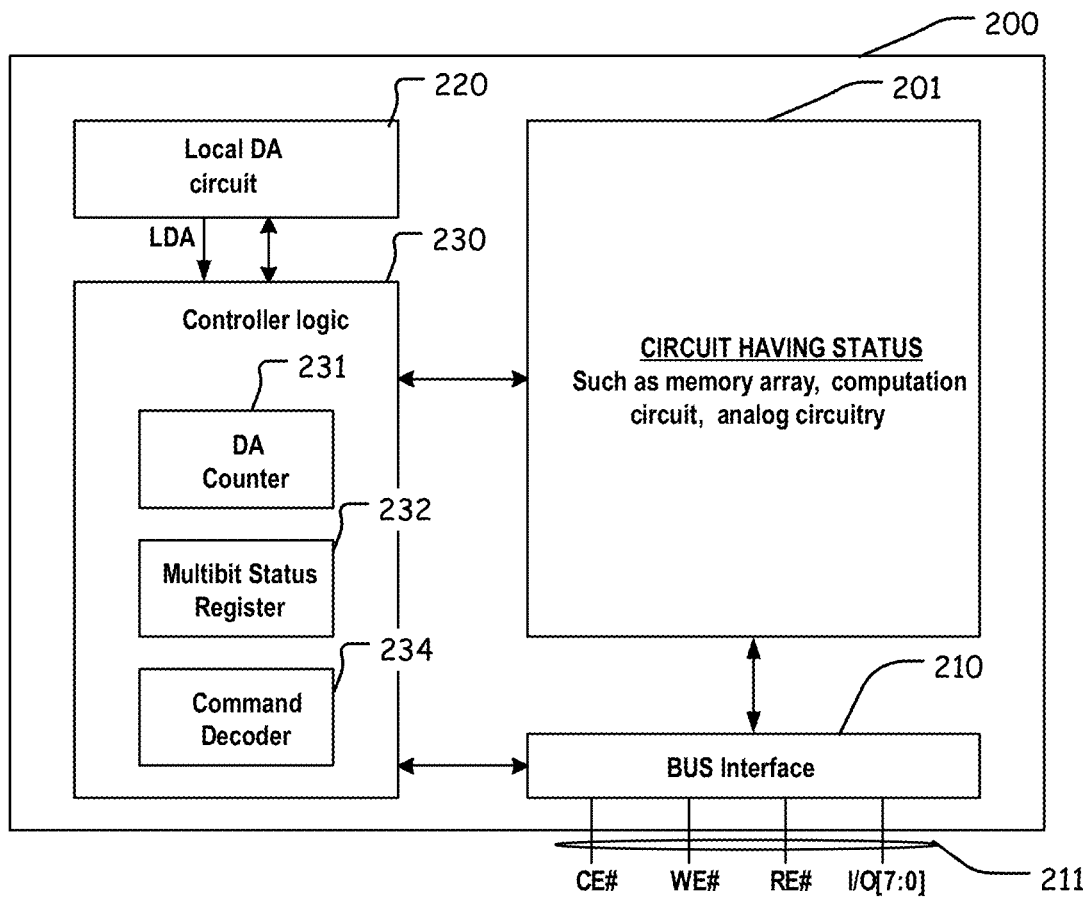
FIG. 2 is a simplified block diagram of an integrated circuit device configured to act as a bus node in a system like that of FIG. 1.

FIG. 2 is a simplified block diagram of an integrated circuit device 200 configured to operate as a bus node device supporting group read status operations. The integrated circuit device 200 can be implemented on a single integrated circuit chip, or on multiple integrated circuit chips configured in a multichip package. The integrated circuit device 200 includes a circuit 201 is used in operations having more than one state, and thus can be characterized as a circuit having status. Examples of circuit 201 include memory arrays, computation circuits, analog circuitry and the like. The circuit 201 can include one or more than one status unit each having a separate status. Status units having status in this context can comprise separate physical circuits, such as separate planes of a memory array and separate components on a so-called system-on-a-chip SOC-like device. Also, status units having status in this context can comprise separate functions executed by circuitry like a microprocessor, programmable gate array or other type of configurable or programmable circuit.

The circuit 201 is connected for data communications with a bus interface 210, or other type of input/output I/O circuit. The bus interface 210 can be, for example, a bus slave interface, such as discussed with reference to FIG. 1. The bus interface 210 includes pins, or other connections, for linking to bus signal lines 211. In this example bus signal lines include bus control signals such as chip enable CE#, write enable WE# and read enable RE#. Also the bus signal lines include data lines I/O[7:0]. In this illustration there are eight data lines. In other embodiments, there may be a different number of data lines and different types and numbers of control signal lines as suits a particular bus system configuration. The bus may include other signal lines not shown, such as bus clock lines and bus power and ground lines.

The bus interface 210 is connected to controller logic 230 on the integrated circuit device 200. In this example, the controller logic includes a device address counter 231, a multibit status register 232, and a command decoder 234. A local DA circuit 220 is provided that is connected to the control logic to provide a local device address LDA. The local device address LDA is a device identifier unique as to other bus node devices on the bus. The local DA circuit 220 can comprise a configuration register for the integrated circuit device 200. A configuration register can be implemented using nonvolatile memory cells, or one-time programmable memory cells. In some implementations, the local DA circuit 220 can be implemented using a register file, an SRAM, or other type of memory. Also, the local DA circuit 220 can be implemented using a plurality of pads on the integrated circuit device 200 that are connected to the reference voltages such as bus power and ground lines, in a pattern to set the local device address for the device 200. See for example, FIG. 7.

The controller logic 230 executes an operation in response to detection of a group read status command by the command decoder 234, by which the status data from multibit status register 232 is transmitted via the bus interface 210 to the bus in a time window identified by the local device address indicated in the local DA circuit 220. As a result, the status data for the integrated circuit device 200 is provided in a unique time window, relative to other bus node devices in a group. The status data may be transmitted in a data packet without an identifier of the bus node in some embodiments, other than the timing window. In other embodiments, the status data may be transmitted in a data packet with an identifier of the bus node as part of the data packet.

Figure 3:
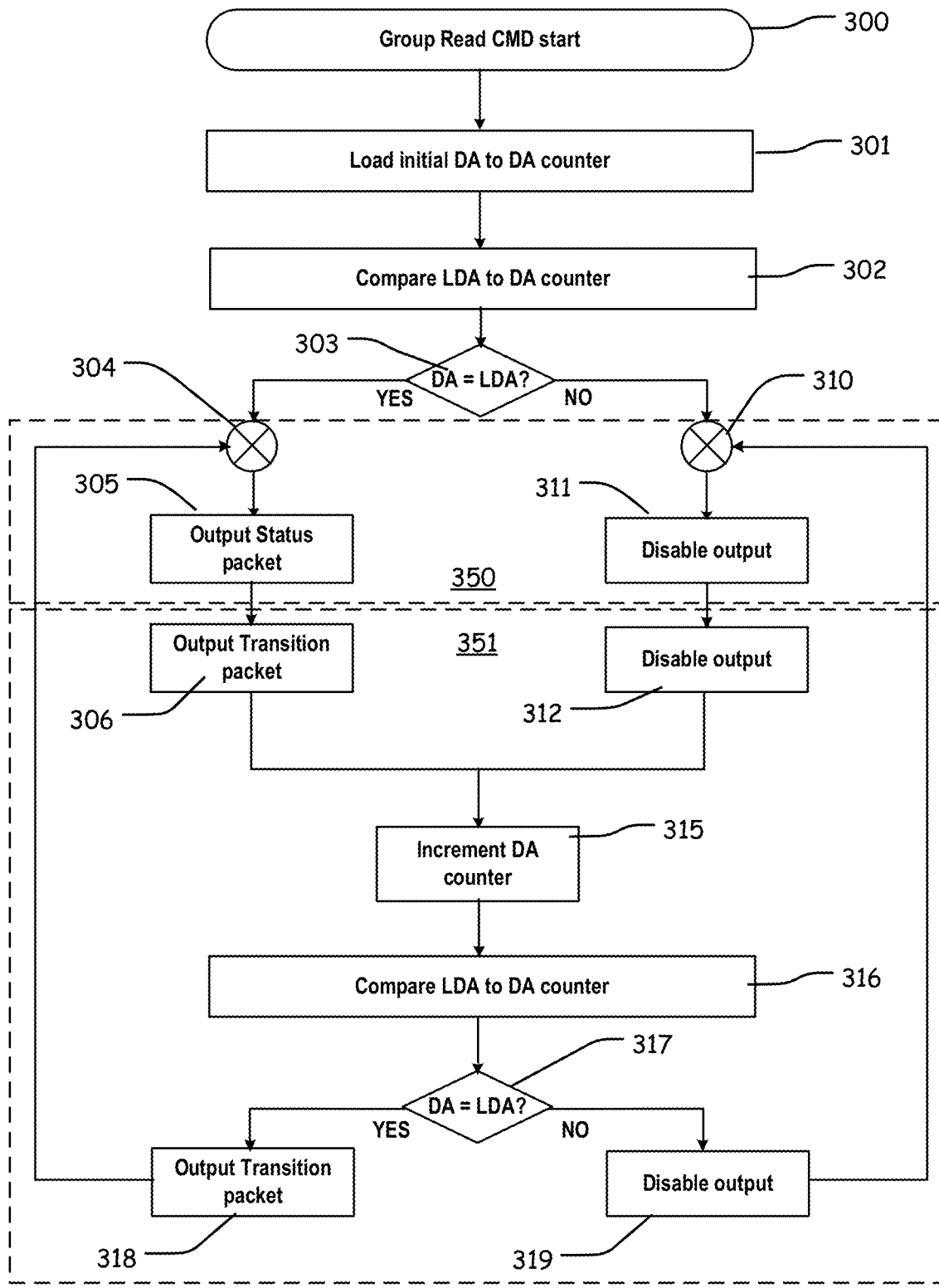
FIG. 3 is a flowchart for an operation executed in a bus node like that of FIG. 2 in support of bus read status operations as described herein.

FIG. 3 is a flowchart of an operation executed by the controller logic 230, or other corresponding logic on other bus nodes in a group of bus nodes. The operation starts on detection of a group read status command (300). Then, an initial device identifier associated with the group read status command is loaded into the device address counter 231 (301). The initial device identifier can be associated with the group read status command by being immediate data in the data packet of group read status command and received as input at the bus interface. The initial device identifier can be stored by the circuit to provide a local device identifier, such as by loading the received input in a counter register in the device address counter 231. Alternatively, the initial device identifier can be a static value associated with the group read command by logic at the bus node device, and provided by the circuit to provide a local device identifier. For example, the initial device identifier can be provided using a counter reset upon detection of the group read command, to set the counter register in the device address counter 231 to a default value (e.g., 000 or 111), used as an initial device identifier.

After loading the initial device identifier, the logic compares the local device address LDA provided by the circuit 220 to the output of the device address counter 231 (302). Next, it is determined whether the comparison of the local device address LDA provided by circuit 220 to the output of the device address counter 231 results in a match or not (303). If it is a match, the flow proceeds through point 304, and then the logic controller outputs a status packet (305) followed by an output transition packet (306). If there is not a match at block 303, then the flow proceeds through point 310, and the logic controller disables output on the bus (311), while the output status packet is output by a matching node as indicated in block 305, and disables output on the bus (312), and while the output transition packet is output by the matching node as indicated in block 306.

Transition intervals occur between the timing windows in which status data is transmitted on the bus by one of the bus nodes. When the transition interval occurs, then the controller logic outputs a transition state on the bus (306, 318). In the transition state, a fixed voltage, or fixed data, is outputted by the nodes to avoid the bus fighting issue between the matching die in the previous cycle and the matching die in the next cycle. The clock signal received by two dies may have an overlapping period, and there may be a bus fighting issue if two dies output different data. Therefore, fixed data (same data pattern or voltage for both dies) is outputted for both dies during the transition period to avoid the bus fighting. The transition state is output at the end of the status output by the matching die of the current cycle, and at the beginning of the status output for the matching die in the next cycle. The non-matching die can disable the respective bus drivers by setting a high impedance state.

After step 306 or step 312, the DA counter is advanced by incrementing the counter, in this example (315). Then, the logic compares the local device address LDA provided by the circuit 220 to the output of the device address counter 231 (316). Next, it is determined whether the comparison of the local device address LDA provided by circuit 220 to the output of the device address counter 231 results in a match or not (317). If it is a match, then the logic controller outputs an output transition packet, matching the output transition packet of the previously matching node. After block 318, then the operation loops to point 304 to output a status packet. If there is not a match at block 317, then the logic controller disables output on the bus (319), and then loops to point 310 to continue disabling the outputs.

As shown, the operation includes a bus timing window for outputting status packets (dashed box 350) and a bus timing window for outputting transition packets (dashed box 351).

If a command termination event occurs (not shown), then the operation terminates. A command termination event can comprise a transition of the control signal, such as a chip enable CE# control signal. Some alternative examples of a command termination event can be an overflow of the device address counter 231, a stop of toggling of a read enable signal, and expiry of the timeout interval.

The operation shown in FIG. 3 includes:
a) comparing the initial device identifier with the local device identifier, and for a match outputting the status data (305) to the data bus during an initial bus timing window (initial window 350), and for a mismatch disabling output to the data bus;
b) advancing the initial device identifier to an advanced device identifier, and comparing the local device identifier to the advanced device identifier, and for a match outputting the status data (305) of the bus node to the data bus in a subsequent timing window (sequential window 350), and for a mismatch disabling output to the data bus;
c) repeating step b).

Also, the operation shown in FIG. 3 includes outputting a transition state (306, 318) to the bus during transition timing windows (window 351) at least one of before and after outputting the status.

The flowchart of FIG. 3 illustrates logic executed by a memory controller or other bus node device. The logic can be implemented using processors programmed using computer programs stored in memory accessible to the computer systems and executable by the processors, by dedicated logic hardware, including field programmable integrated circuits, and by combinations of dedicated logic hardware and computer programs. It will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the technology presented, and it will be understood that numerous additional steps for accomplishing other functions can be performed before, after and between those shown.

Figure 4:
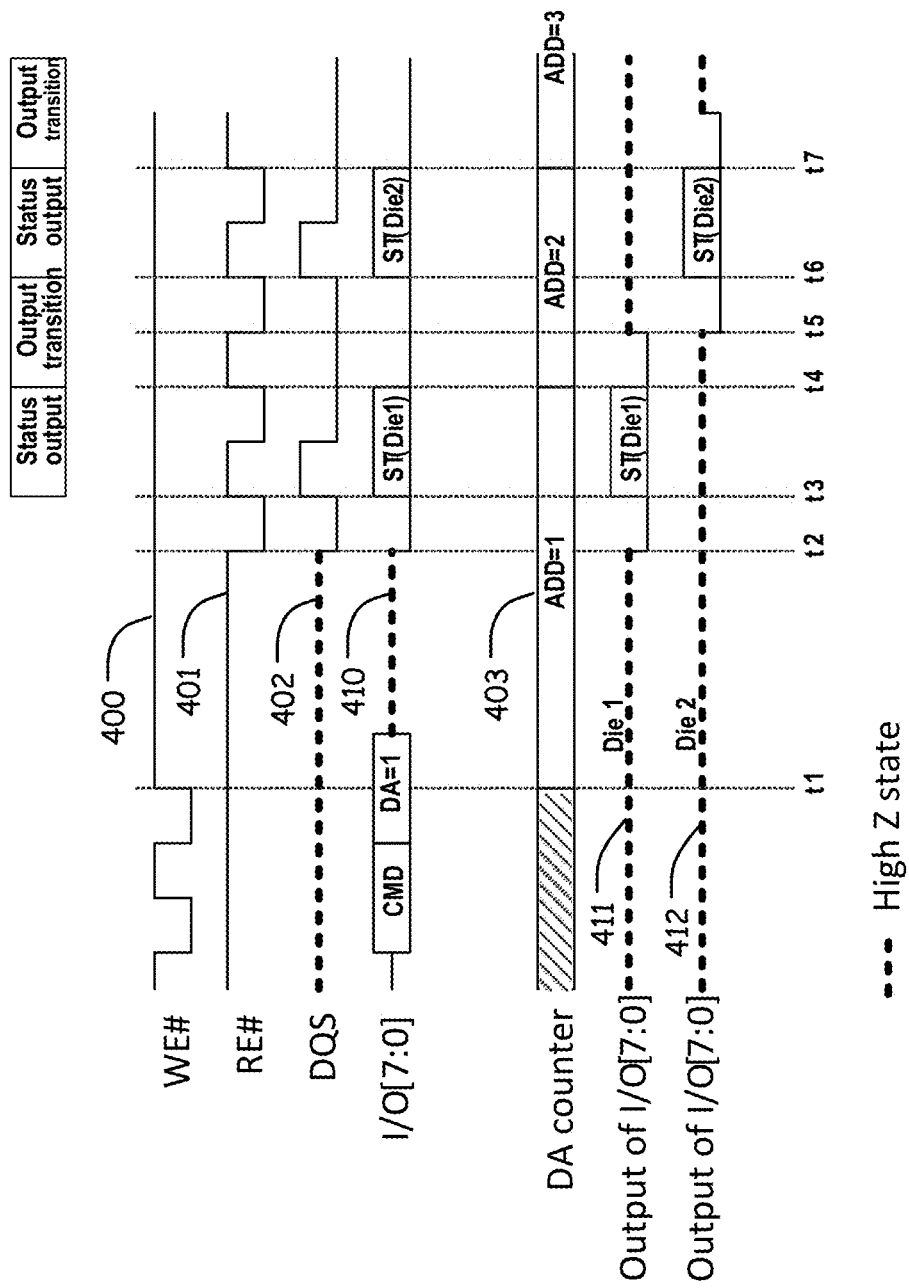
FIG. 4 is a timing diagram of a group read status operation on a data bus like that shown in FIG. 2.

FIG. 4 is a timing diagram for signals on the bus of FIG. 2, during a group read status operation. Bus signals illustrated include a write enable WE# 400, a read enable RE# 401, and a bus clock DQS 402. Also the status of the device address counter DA Counter 403 on the bus nodes is illustrated. On line 410, the data transmitted and received on the data lines at the source node is illustrated. On lines 411 and 412, the data transmitted by the bus node devices "Die 1" and "Die 2" is illustrated. The outputs of the source on line DQS and on line I/O[7:0] and of the Die 1 and Die 2 nodes on I/O[7:0] are set to a high impedance state (High Z) during the intervals indicated by the dashed lines.

As seen, the source node transmits a group read status command packet that includes a CMD field and an initial device address field, DA=1. At time t1, after toggling of the WE#, the bus nodes load the initial device address into the counter. At time t2 the bus nodes prepare their outputs for transmitting status data, and the RE# begins toggling and continues toggling until the completion of the operation. Also, the DQS signal toggles in coordination with the data transmitted by the bus nodes. At time t3, the bus node shown on line 411 outputs a status packet on the bus which is received at the source node on line 410. The status packet timing window ends at time t4. A transition interval is executed by the bus nodes between time t4 and t6, and the address counters on the bus nodes are incremented. At time t6, the bus node shown on line 412 outputs a status packet on the bus which is received at the source node. The timing window for the status packet ends at time t7. Thereafter a transition interval is executed by the bus nodes and the counters in the bus nodes are advanced, and the procedure continues until a termination event at which time all the bus nodes in the group of bus nodes on a given bus have transmitted status information to the source node. An example of a termination event can be changing a control signal on the bus from a toggling state to a steady state. For example a read enable signal RE# may be toggled by the source node during the group read status operation, and the termination event can be a stop of the toggling of the read enable signal.

As seen, the group read status command is transmitted by the source node on the data lines I/O[7:0], and the status packets include multiple bits, and are transmitted by the bus nodes on one or more of the same data lines I/O[7:0].

Figure 5:
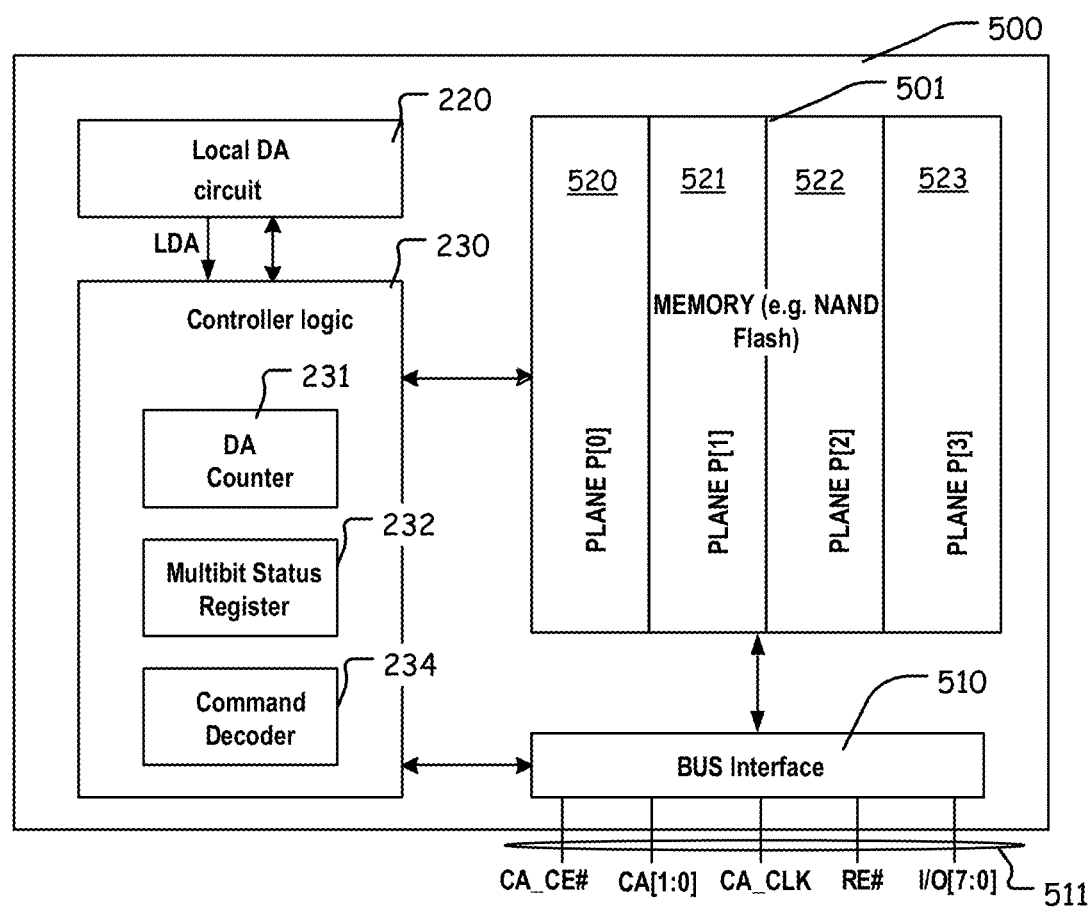
FIG. 5 is a simplified block diagram of an integrated circuit memory device configured to act as a bus node in a system like that of FIG. 1, having multiple status units and an example of a different data bus configuration.

FIG. 5 illustrates another integrated circuit device 500 like that shown in FIG. 2, having a different bus interface. Also, the circuit 501 is used in operations having more than one state, and thus can be characterized as a circuit having status in FIG. 5 is a memory such as a NAND Flash memory. The memory has a plurality of planes (520, 521, 522, 523) labeled P[3:0]. In some embodiments, each plane is a separate status unit for the device 500. Components of the integrated circuit device 500 like those of the device shown in FIG. 2 are given the same reference numerals. Integrated circuit device 500 has a different bus interface 510. As illustrated, the bus interface 510 has connections to bus lines 511 including CA_CE# (command/address lines enable), CA[1:0] (command/address lines), CA_CLK (command/address clock), RE# (read enable), and I/O[7:0] (data lines).

Figure 6:
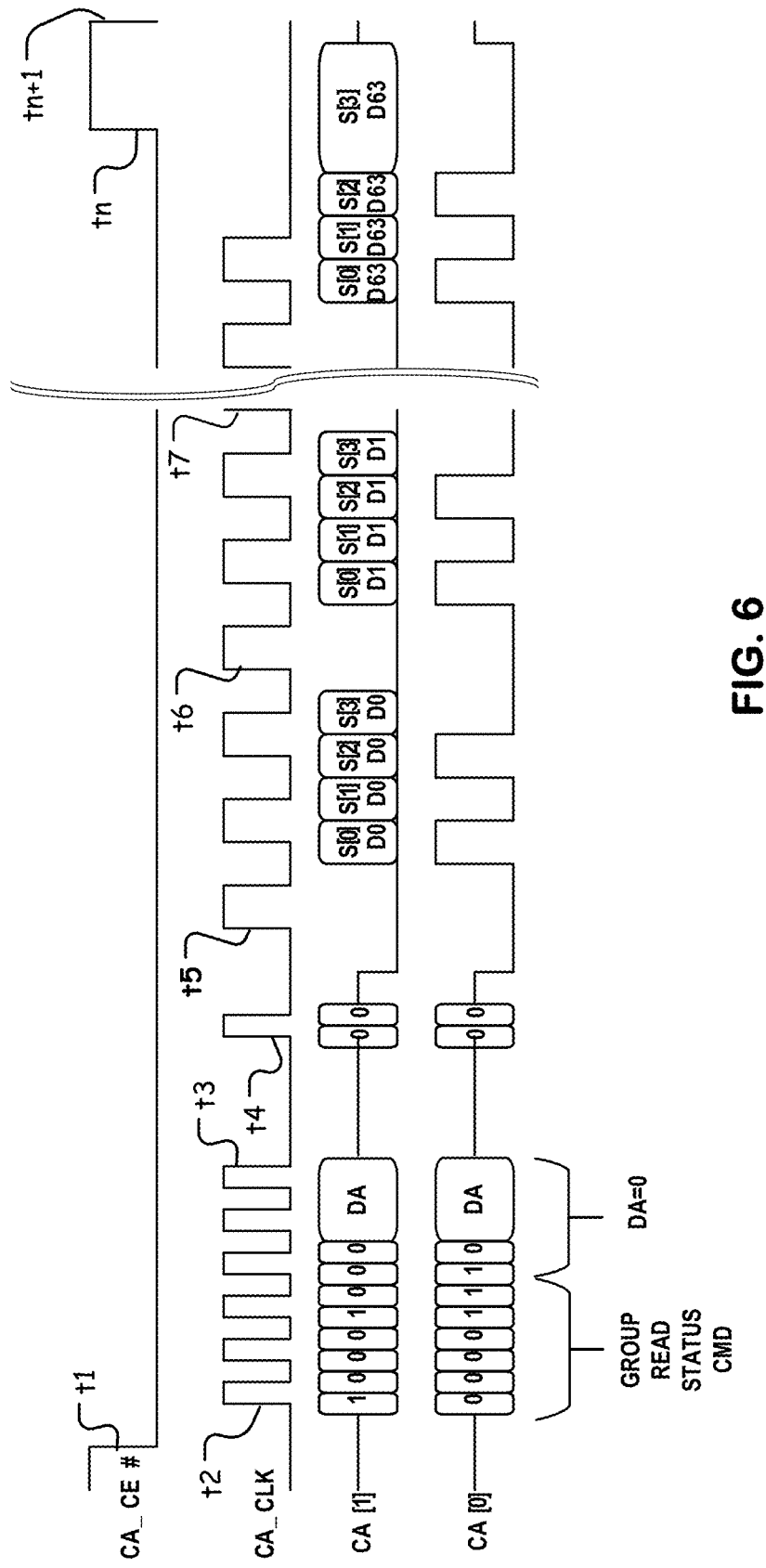
FIG. 6 is a timing diagram of a group read status operation on a data bus like that shown in FIG. 5.

FIG. 6 is a timing diagram for signals on the bus of FIG. 5, during a group read status operation. Bus signals illustrated include command/address chip enable CA_CE#, command/address clock CA CLK and command/address lines CA[0] and CA[1]. The separate data lines I/O[7:0] are not illustrated, and are not used in this example. In other examples, the data lines I/O[7:0] may be used for carrying status packets or other data associated with the group read status operation. The group read status operation is initiated on the toggling of the CA_CE# signal at time t1, and terminates at time tn. Between times t2 and t3, the CA CLK toggles at a first clock speed and the group read status command and device address are output by the source on the command address status lines CA[0] and CA[1]. In this example, the group read status command includes a two-bit header and four bits on each line, followed by a two-bit header and a device address.

At time t4, a CA output write header is output on the CA[1:0] lines to start the output sequence. The CA_CLK begins toggling at a second clock rate. There are three clock cycles in this example to output status of each node. The first two are the status output cycles carrying 4 status bits, one for each plane on the CA[1] line. The third clock cycle corresponds with the transition interval in which the current node and the next node output the same voltage to prevent bus fighting. As shown in the drawing, there is a delay from the CA_CLK rising and falling edges to the data output at each node. Thus, as illustrated, during a timing window between t5 and t6, a status packet from device D0 is transmitted on the CA[1:0] lines. During a timing window between t6 and t7, a status packet from device D1 is transmitted on the CA[1:0] lines, and so on until the termination event is at time tn, indicated by a transition of the CA CE# signal to a high value.

As seen in this example, the group read status command is transmitted by the source on specific lines, which are the CA[1:0] lines in this example, and the status packets are transmitted on one of the specific lines (CA[1]) of the same CA[1:0] lines by the bus nodes. In other embodiments, both of the CA[1:0] lines may be utilized for the status packets. In other embodiments, the I/O[7:0] lines may be utilized for one or both of the command and the status packets.

Figure 7:
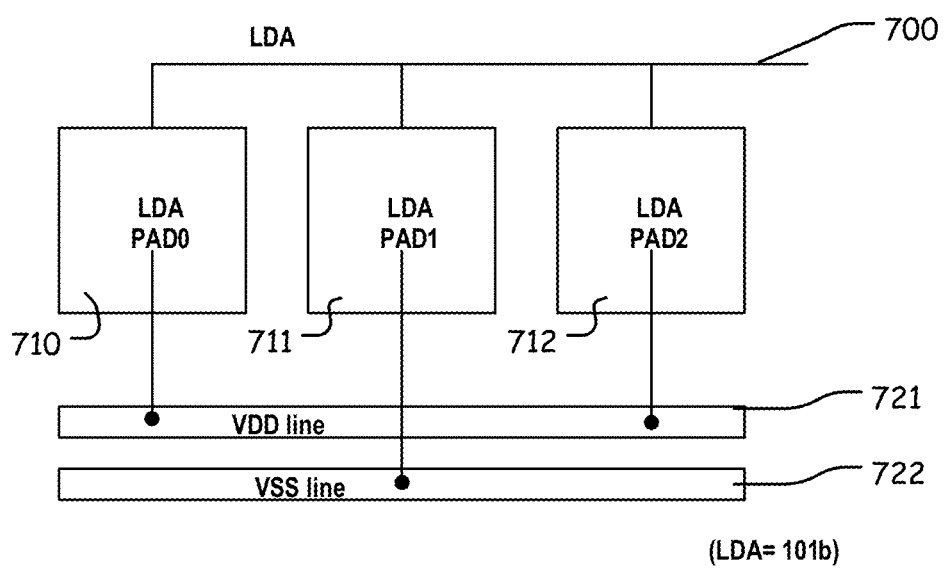
FIG. 7 is a simplified diagram of a circuit to provide a local device address, suitable for use on bus node devices described herein.

In the embodiments of FIGS. 2 and 5, the bus nodes each have a circuit to provide a local device address LDA that is unique as to other bus nodes on the bus. FIG. 7 is a diagram illustrating one circuit suitable for this use. Each bus node can include an integrated circuit having a plurality of pads, (e.g., pads 710, 711, 712). A source of reference voltages, such as bus power VDD line 721 and ground VSS line 722 is connected to the plurality of pads in a pattern that is unique to other bus nodes on the same bus. In this example, pad 710 and pad 712 are connected to the VDD line 721, and pad 711 is connected to the VSS line. This sets a local device address LDA of 101b, which is provided on line 700 to the logic on the device for use in assigning a timing window for transmitting status information on the bus in a group read status operation. In one example, a plurality of memory devices such as illustrated in FIG. 5 can be mounted in a multichip package, and the pads on each device can be wire bonded in a unique pattern. For an eight device package, pads[2:0] of device 0 are wire bonded to ground setting the local device address to 000b. The pads[2:0] of device 1 are wire-bonded to 001b, . . . and the pads[2:0] of device are wire-bonded to 111b.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:
1. A system, comprising:
    a data bus;

a source node device on the data bus, the source node device configured to transmit a group read status command on the data bus; and a group of bus node devices on the data bus, each respective bus node device in the group having a unique address on the data bus and each respective bus node device being configured to respond to the group read status command in sequence by transmitting status data on the data bus in respective, non-overlapping timing windows.

2. The system of claim 1, wherein the data bus includes a set of I/O signal lines, the group read status command is issued on specific lines in the set of I/O signal lines, and the status data is transmitted in sequence on one or more of the specific lines in the set of I/O signal lines.

3. The system of claim 1, wherein the data bus includes a set of data lines and a separate set of command/address lines, and the group read status command is issued on the set of command/address lines and the status data is transmitted in sequence on the set of command/address lines.

4. The system of claim 1, wherein the data bus includes a set of data lines and a separate set of command/address lines connected to the bus node devices in the group, and the group read status command is issued on the set of command/address lines, and the status data is transmitted in sequence on the set of command/address lines.

5. The system of claim 1, wherein at least one bus node device in the group of bus node devices has a plurality of status units, and wherein the status data transmitted in sequence includes a ready/busy status of each respective status unit of the plurality of status units of the at least one bus node device in the group.

6. The system of claim 1, wherein the bus node devices in the group include, respectively, a plurality of bonding pads connected to reference voltages in different bonding patterns to provide local device addresses.

7. The system of claim 1, wherein each respective bus node device in the group includes an integrated circuit device comprising:

a bus interface for connections to the data bus;

a circuit to provide a status of resources on the integrated circuit device;

a circuit to provide a local device identifier; and a command decoder in communication with the bus interface, to detect a group read status command associated with an initial device identifier, and in response to detection of the group read status command, to execute an operation including:

a) comparing the initial device identifier with the local device identifier, and for a match outputting the status data of the respective bus node device to the data bus during an initial bus timing window, and for a mismatch disabling output to the data bus; and b) advancing the initial device identifier to an advanced device identifier, and comparing the local device identifier to the advanced device identifier, and for a match outputting the status data of the respective bus node device to the data bus in a subsequent timing window, and for a mismatch disabling output to the data bus.

8. The system of claim 7, wherein the operation includes outputting a transition state to the data bus during transition timing windows at least one of before and after outputting the status data.

9. The system of claim 7, wherein the integrated circuit device of each respective bus node device includes a memory having a plurality of status units, and wherein the status of the respective bus node device includes a ready/busy status of the plurality of status units.

10. The system of claim 1, comprising another data bus and another group of bus node devices, each respective bus node device in the other group of bus node devices being configured to respond to a group read status command, as provided on the other data bus by the source node device by transmitting status data, in sequence, on the other data bus in respective, non-overlapping timing windows.

11. An integrated circuit device, comprising:

a bus interface for connection to a bus;

a circuit to provide status data of resources on the integrated circuit device;

a circuit to provide a local device identifier; and a command decoder in communication with the bus interface, to detect a group read status command associated with an initial device identifier, and in response to detection of the group read status command, to execute an operation including:

a) comparing the initial device identifier with the local device identifier, and for a match outputting the status data to the bus during an initial bus timing window, and for a mismatch disabling output to the bus; and b) advancing the initial device identifier to an advanced device identifier, and comparing the local device identifier to the advanced device identifier, and for a match outputting the status data to the bus in a subsequent bus timing window, and for a mismatch disabling output to the bus.

12. The integrated circuit device of claim 11, wherein the operation includes outputting a transition state to the bus during transition timing windows at least one of before and after outputting the status data.

13. The integrated circuit device of claim 11, wherein the bus interface includes a set of I/O signal lines, the group read status command is received on specific lines in the set of I/O signal lines, and the status data output is transmitted on one or more of the specific lines in the set of I/O signal lines.

14. The integrated circuit device of claim 11, wherein the bus interface includes a set of data lines and a separate set of command/address lines, and the group read status command is received on the set of command/address lines and the status data output is transmitted in sequence on the set of command/address lines.

15. The integrated circuit device of claim 11, wherein the bus interface includes a set of data lines and a separate set of command/address lines, and the group read status command is received on the set of command/address lines, and the status data output is transmitted on the set of command/address lines.

16. The integrated circuit device of claim 11, wherein the circuit to provide a local device identifier comprises a plurality of bonding pads connected to external voltages in a bonding pattern.

17. The integrated circuit device of claim 11, wherein the circuit to provide a local device identifier comprises a register.

18. The integrated circuit device of claim 11, including a circuit having one or more status units, and wherein the status data includes a ready/busy status of the one or more status units.

19. The integrated circuit device of claim 11, including a memory having one or more status units, and wherein the status data includes a ready/busy status of the one or more status units.

20. The integrated circuit device of claim 19, wherein the memory is a NAND flash memory.

\* \* \* \* \*